Feb. 24, 1931.　　　J. WHITAKER　　　1,794,266
CHECK WRITER
Filed Jan. 21, 1930　　　5 Sheets-Sheet 2

Inventor
John Whitaker
by his Attorneys
Howson & Howson

Feb. 24, 1931.                J. WHITAKER                1,794,266
                              CHECK WRITER
                           Filed Jan. 21, 1930          5 Sheets Sheet 3

Feb. 24, 1931.  J. WHITAKER  1,794,266
CHECK WRITER
Filed Jan. 21, 1930   5 Sheets-Sheet 4

Inventor
John Whitaker
by his Attorneys
Howson &
Howson

Patented Feb. 24, 1931

1,794,266

UNITED STATES PATENT OFFICE

JOHN WHITAKER, OF NORTH WALES, PENNSYLVANIA, ASSIGNOR TO SAFE-GUARD CHECK WRITER CORPORATION, OF LANSDALE, PENNSYLVANIA, A CORPORATION OF PENNSYLVANIA

CHECK WRITER

Application filed January 21, 1930. Serial No. 422,357.

This invention relates to check writing machines, and the object of the invention is to produce a highly efficient device which can be quickly set to any desired amount which is to be written on a check placed in the machine.

Another object of the invention is to provide simple efficient mechanism by which the machine can be quickly cleared for the writing of a second check for a different amount from that of the first written check.

Another object of the invention is to provide simple efficient mechanism by which any error made in the setting of any of the characters to be written on the check may be individually and quickly corrected.

Another object of the invention is to provide simple efficient mechanism for scarifying the portion of the check bearing the payee's name simultaneous with the printing and scarifying of the characters denoting the amount to which the check is drawn.

Another object of the invention is to provide a simple efficient protective scarifying symbol at the beginning of the amount line to prevent the raising of the amount of the check by adding numerals to the head of the amount line after the check has been written, and to provide scarifying symbols in the columns on the amount line for which no number has been selected.

Another object of the invention is to separate the columns denoting dollars from the columns denoting cents by scarified letters denoting to what the various columns pertain.

And still another object of the invention is to construct the type bars of the machine in such a manner that the characters on the face of the bars which are readable from the outside of the machine will not become obliterated or in any way defaced by constant use of the machine.

Other objects of the invention, such as pertain to details of construction, and the operation of the device will be more fully disclosed hereinafter, reference being had to the accompanying drawings, of which:

The machine comprises a main frame 1 which is composed of a right side member 2, a left side member 3, a front member 4, and a rear member 5, all of which are punched from sheet metal and pressed into the desired shapes to be rigidly assembled, as by welding, to form the rigid main frame 1 of the machine.

Figure 7:
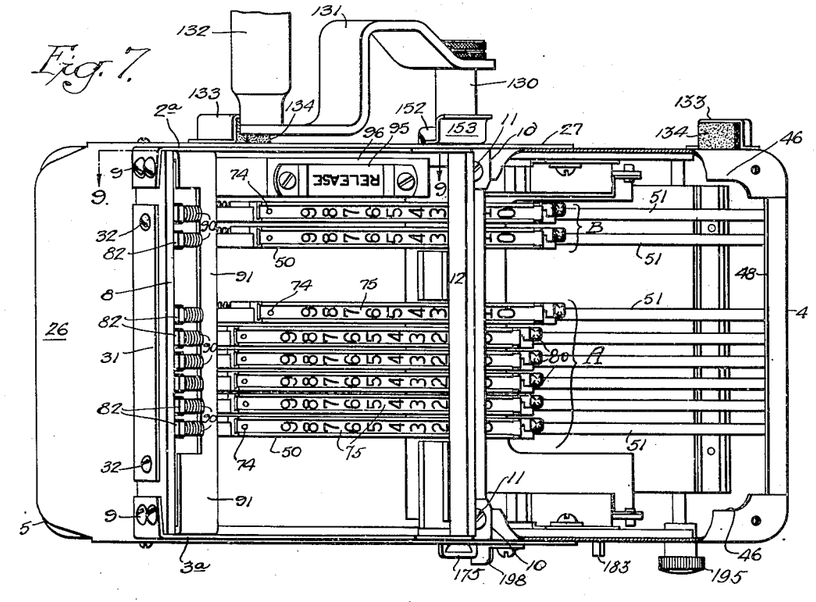
Fig. 7 is a plan view with the top covers removed.

The side members 2 and 3 are respectively provided with check-receiving slots 6 and 7 which, when the frame members are assembled, are in alignment with each other transversely of the machine and extend inwardly from the rear of the machine to a point adjacent, but spaced inwardly from, the front end of the machine, the said slots being disposed at an angle relative to the base of the machine, as clearly shown in Figs. 2, 3, 4 and 5. The slots 6 and 7 divide the respective side members 2 and 3 into upper overhanging frame sections 2a and 3a and lower base sections 2b and 3b respectively. The rear ends of the overhanging frame sections 2a and 3a are rigidly secured to an upper transversely extending rear frame member 8, by means of screws 9, 9 as clearly shown in Fig. 7.

At a point intermediate the ends of the frame, the said side frame members 2a and 3a are secured to the opposite ends of a transversely extending thrust bar 12, by means of screws 11, which pass through ears 10, 10 on the said frame members and enter threaded openings formed in the bar 12. The bar 12 is of angular cross-section, in the present instance, having one leg 13 thereof disposed substantially parallel to the check slots in the side members 2 and 3, the second leg 14 of the said angular bar 12 being disposed substantially perpendicular to the leg 13 and slots 6 and 7 and substantially parallel to the rear frame bar 8, as clearly shown in Figs. 4 and 5.

Extending around the base of each of the slots 6 and 7 and along the upper and lower sections 2a, 2b, 3a, 3b are reinforcing plates 15, 15 which, in the present instance, are welded or otherwise rigidly secured to the said side frame members 2 and 3 for the purpose of stiffening the upper overhanging frame portions 2a and 3a of the said side frame members to prevent flexing of the side frame members due to the thrust attendant to the printing and scarifying operation which will be fully disclosed hereinafter.

Figure 4:
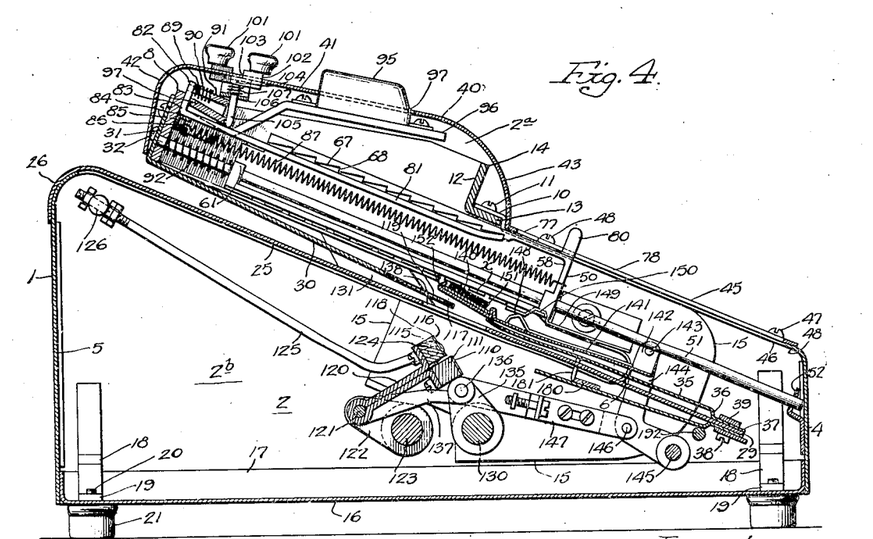
Fig. 4 is a longitudinal sectional elevation taken on the line 4—4, Fig. 1.
Figures 5, 10:
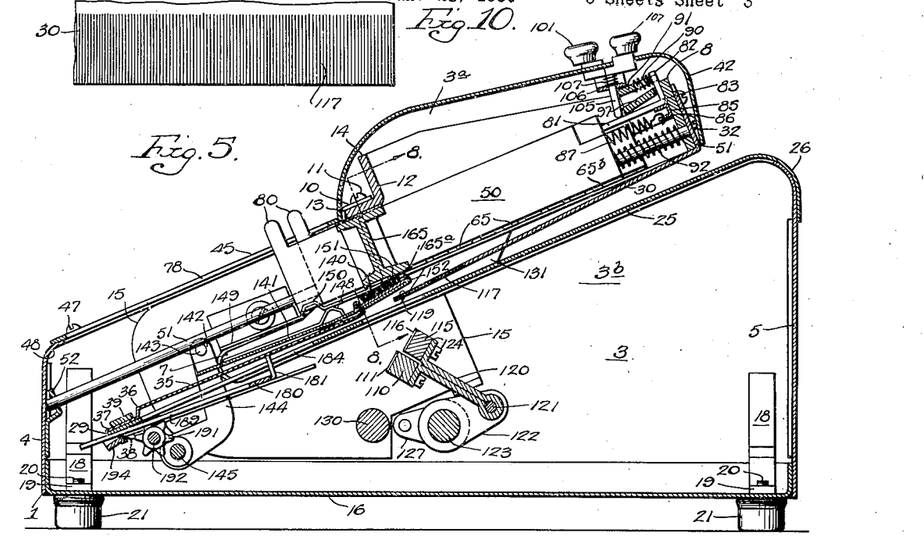
Fig. 5 is a longitudinal sectional elevation taken on the line 5—5, Fig. 1.
Fig. 10 is a fragmentary view of a detail of the invention.

The base of the machine is closed by a bottom plate 16 having a flange 17 which is adapted to fit within the main frame 1 of the machine and to engage the members 2, 3, 4 and 5 thereof as clearly shown in Figs. 4 and 5, the said bottom plate being disposed in fixed relation to the main frame 1 by means of brackets 18 which are welded or otherwise rigidly secured to the said frame 1 and provided with feet 19 against which the bottom plate 16 rests, the said bottom plate 16 being secured to the feet 19 by means of screws 20 which project through the plate 16 from feet 21, 21 which may be of rubber or other soft resilient material to prevent scratching of the surface on which the machine rests.

Figure 8:
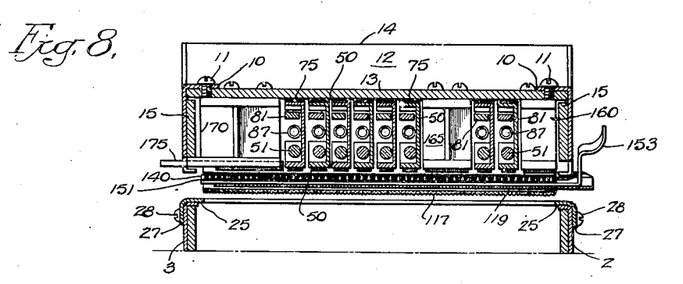
Fig. 8 is a transverse sectional elevation taken on the line 8—8, Fig. 5.

The base portion of the machine is closed at its top, that is along the lower edge of the check-receiving slots 6, 7, of the side frame members 2, 3, respectively, by a plate 25 which forms a support for the check to be written, the said plate 25 being provided with a depending flange 26 which lays around the rear wall 5 of the main frame 1 and along its longitudinally extending side edges the said plate 25 is provided with depending flanges 27, 27 which overlie the side frame members 2 and 3 respectively, being secured thereto by screws 28, 28, as shown in Fig. 8.

Figure 6:
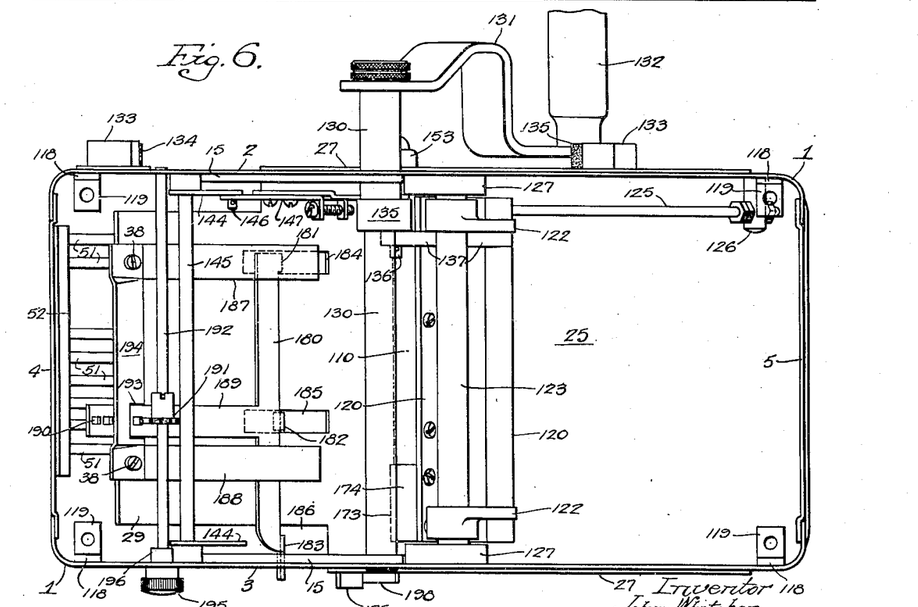
Fig. 6 is an inverted plan view with the bottom plate removed.

The check-supporting plate 25, as shown in Figs. 4, 5 and 6, extends forward beyond the bases of the slots 6 and 7, as illustrated at 29 in said figures. The upper wall of the check cavity, comprising the slots 6 and 7 and the check-supporting plate 25, is formed partly by a resilient plate 30 and partly by a second resilient plate 35.

The plate 30 normally extends at an angle with respect to the check-supporting plate 25 and is provided at one end with a flange 31 which is secured by screws 32 to the transversely extending bar 8 at the rear of the upper overhanging portion of the frame of the machine, the end of the plate 30 lying adjacent the bar 8 being substantially in contact with the said bar, from which the said plate extends at an angle downwardly toward the check-supporting plate 25, terminating at a point substantially below the center of the leg 13 of the thrust bar 12.

The resilient plate 35 is provided with a portion 36 disposed substantially at right angles to the said plate which termintes in a portion 37 disposed substantially parallel to the plate 35 and adapted to rest on the forward end 29 of the check-supporting plate 25, being secured thereto by screws 38 which pass through the plates 25 and 37 and thread into conrrespondingly threaded apertures formed in a transversely extending bar 39 disposed on top of the foot 37 of the plate 35. From its line of anchorage the plate 35 extends rearwardly to a point close to but spaced apart from the forward end of the plate 30.

The rear top portion of the machine is closed by a cover 40 having a substantially flat top portion 41 and a rear portion 42 which extends downwardly from the said top portion 41 outside the transverse plate 8 and the flange 31 of the plate 30. The front portion 43 of the cover 40 curves downwardly around the thrust bar 12, terminating at a point substantially in alignment with the lower surface of the leg 13 of the said thrust bar. The cover 40 is also provided with side flanges 44 which extend downwardly around the upper frame sections 2a and 3a of the side frame members 2 and 3 of the machine, being secured thereto by screws 45.

The forward portion of the upper side of the machine is closed by a plate 45 which is disposed in a plane substantially parallel to the slots 6 and 7 in the side frame members 2 and 3 respectively, the said plate 45 being secured to an inturned flange 46 on each of the said side members 2 and 3 by means of screws 47, 47. The front member 4 of the frame having an inturned flange 48 which underlies the forward edge of the cover plate 45.

Slidably mounted in the overhanging portion of the machine is a series of type bars 50 which are divided into groups A and B, the group A being adapted for printing the number of dollars on a check being written while the group B is adapted for printing the number of cents to be printed on the check.

The said type bars 50 of each group are disposed immediately adjacent and parallel to each other and adapted for movement longitudinally of the machine in a plane substantially parallel to the check-receiving slot formed therein. Each of the type bars 50 is slidably mounted on and supported solely by a supporting rod 51. In each of these supporting bars 51 is rigidly mounted at the forward end of the machine in a bracket or bearing 52 and at the rear of the machine in the transversely extending frame member 8 thereof.

Each type bar comprises a vertically disposed longitudinally extending web 55, a laterally extending bottom flange 56 and a laterally extending upper flange 57, which at the front end of the bar are connected by a vertically and laterally extending flange 58. The lower portion of the front flange 58, adjacent the bottom flange 56 is thickened, as illustrated at 59, to provide the bearing 60 for the supporting rod 51, the rear end of each bar being provided with the vertically and laterally extending block 61 which projects upwardly from the lower flange 56 and is provided with a bearing 62 for the said supporting rod 51.

Figures 11, 12, 13, 14, 15, 16, 17:
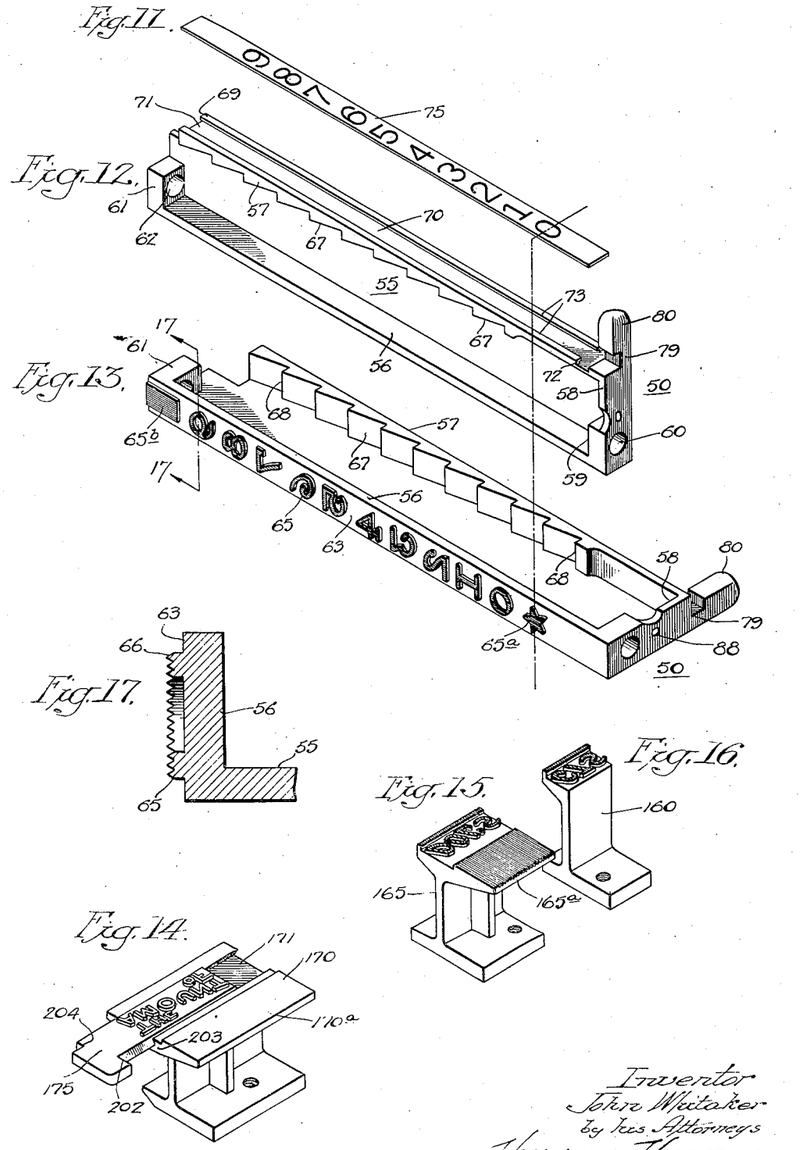
Figs. 11 and 12 constitute a detached perspective view of one of the type bars.
Fig. 13 is a perspective view of one of the type bars showing the printing scarifying characters on the underside thereof.
Fig. 14 is a perspective view of the detachable protective symbol adapted to be placed at the beginning of the amount line and its mounting.
Figs. 15 and 16 are perspective views of the dollar and cent printing and scarifying blocks respectively.
Fig. 17 is a sectional view taken on the line 17—17, Fig. 13.

The under side 63 of the bottom flange 56 of each of the type bars 50 is provided with a plurality of numerical type characters and other suitable symbols indicated at 65 in Fig. 13, the numerals running in sequence from zero to nine, starting at the front end of the bar and being preceded by a symbol 65a, in the present instance is shown as a star, the last numeral in the row being followed by a plain block indicated at 65b.

As shown in Figs. 13 and 17, the characters 65, 65a and 65b are raised above the surface 63 of the type bar and provided with ridges 66 which extends longitudinally of the type bar and in alignment throughout the entire length of the type bar, through each of the characters formed thereon for purposes hereinafter set forth.

The under side of the upper laterally extending flange 57 of each type bar 50 is provided with a series of ratchet teeth 67, providing a shoulder 68 for each of the numerical characters formed on the lower face of the type bar.

The upper surface 69 of each of the type bars 50 is provided with an undercut groove 70 which is adapted to receive a strip 75 on which is printed or otherwise formed identifying numerical characters corresponding to those formed on the under surface 63 of the type bar.

As shown in Fig. 12, the undercut groove 70 has a base surface 71 on which the strip 75 rests, the strip 75 and the surface 71 being of lesser width than the width of the type bar 50 providing a vertically extending wall 72 along each side of the strip-bearing surface 71, each of the vertical walls 72 terminating in a flange 73 which extends inwardly toward each other over the opposite longitudinal edges of the character strip 75, whereby the said character strip is held in the type bar 50 with its character-bearing surface disposed below the plane of the upper bearing surface 69 of the type bar 50, so that when type bars 50 are moved longitudinally under the thrust bar or abutment 12, with which the bearing surface 69 of the type bar is adapted to engage, the character-bearing surface of the strip 75 lying below the plane of the abutment-engaging surface 69 of the type bar will at no time contact with the said thrust bar or abutment 12, thus avoiding the defacing or obliterating of the characters on the type bar. If desired the strips 75 may be held against longitudinal movement relative to the type bars 50 by any suitable means, and in the present instance I have shown the strip material pressed into the metal of the type bar 50 by means of a center punching 74.

Each of the type bars 50 is provided at its forward end with a finger grip 80 which is adapted to extend above the cover plate 45 at the front end of the machine, the said finger grip having a portion 79 of reduced width which extends through a corresponding slot 78 formed in the said plate 45 the rear end of each of the slots 78 in the said plate 45 having an enlarged opening 77 of sufficient dimensions to permit the passage of the finger grip 80. The opening 77 serves also as windows in the plate 45, through which the characters on the strip 75 may be read from the outside of the machine.

The supporting bars 51 being the sole means of support for the said type bars 50, and being of circular cross-section permit transverse rocking movement of the type bars around the supporting bars 51, this rocking movement being limited by the sides of the slots 78 engaging the finger lugs 80, thereby functioning as guides for the said type bars throughout the longitudinal movement thereof.

Figure 1:
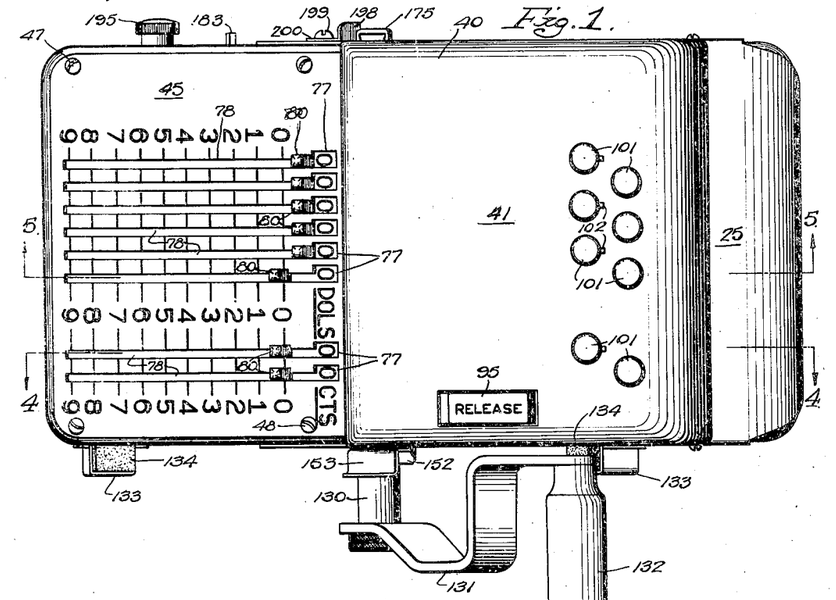
Fig. 1 is a plan view.

As shown in Fig. 1, all of the enlarged openings or windows 77 are in alignment transversely of the machine, on what may be termed the setting line of the machine, the said setting line being disposed in front of the actual printing line $x$ of the machine which is immediately under the said thrust bar or abutment 12.

As above noted, the printing bars are adapted to be moved longitudinally of the machine under the thrust bar 12 for the purpose of setting the machine for the writing of a desired amount on the check, and in so doing the identifying character brought into view in the window 77 on the setting line of the machine will correspond with the printing and scarifying character on the under side of the type bar, which will be simultaneously brought into position on the printing line x of the machine, which, as above noted, is disposed directly under the thrust bar 12.

The printing bars 50 are maintained in the position to which they are adjusted in the setting of the machine by pawls 81, the forward ends of which are adapted to engage the shoulders 68 of the said type bars, the rear ends of the pawls being bent upwardly as indicated at 82, substantially at right angles to the main longitudinal portion 81 of the pawl, the angle portion 83 of each pawl resting on a shelf formed by one leg 84 of a bar 85 which is of channel cross-section and is secured to the rear frame bar 8 of the machine, the second leg 86 of said channel bar 85 being provided with a series of apertures into which the rear ends of a series of springs 87 are fastened, the forward ends of the springs 87 being secured in openings 88 formed in the front flanges 58 of the said type bars 50.

The up-turned portion 82 of the pawls 81 are adapted to be engaged by springs 89 which are supported on pins 90, extending rearwardly from a transversely extending bar 91 which is rigidly secured to the frame of the machine, the springs 89 tending to rock the pawls 81, using the angle portion 83 as a pivot, resting in the angle formed between the plate 8 and the leg 84 of the channel bar 85, and forcing the forward end of the pawl up into engagement with the ratchet teeth 67 of the type bar.

Surrounding each of the supporting rods 51 adjacent the frame bar 8 is a buffer spring 92 which is adapted to extend between the frame bar 8 and the rear bearing 61 of each of the type bars, so that when the pawls 81 are released from the bars 50, in a manner hereinafter set forth, the springs 87 will return the type bars 50 to neutral positions, wherein all the type bars of the group A toward the left side of said group will show blank through the setting window 77 with the stars 65a in alignment on the printing line x under the thrust bar 12, while the type bar 50 at the extreme right side of the dollar group A and the two bars of type B which denote cents will assume neutral positions one step in advance of the first mentioned group of dollar bars, showing zero in their respective setting windows on the setting line and a corresponding zero on the under side of the bar of the printing line x of the machine, the difference in the neutral positions in the bars being due solely to differences in the lengths of the buffing springs 92.

Figure 9:
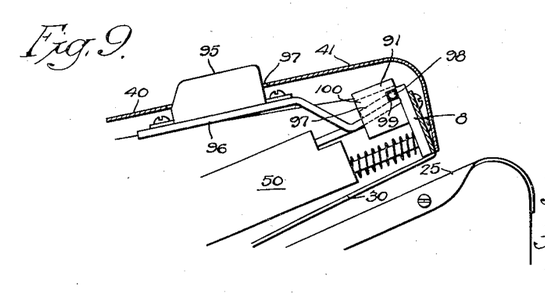
Fig. 9 is a fragmentary sectional elevation taken on the line 9—9, Fig. 7.

The machine may be entirely cleared in one simultaneous operation by pressing a release button indicated at 95. This release button is mounted on a lever 96 and passes through an opening 97 formed in the top 41 of the cover 40. The lever 96 is formed integral, in the present instance, with a bar 97 which extends transversely across the machine above the pawls 81 and is provided at its opposite ends with trunnions 98 (see Fig. 9), which are disposed in openings 99 formed in depending portions 100 of the above mentioned spring-carrying bar 91. The forward edge of the release bar 97 rests on top of the said pawls 81 and when the release button 95 is depressed the said release bar 97 is rocked about its trunnions 98, which in turn rocks each of the pawls 81 about their fulcrums 83, releasing the pawls from the shoulders 68 of the printing bars 50 with which they are engaged, whereby the springs 87, which control the individual type bars 50, return the said bars to their neutral positions in contact with the buffer springs 92 as above noted.

If it is desired to return any individual type bar 50 to its neutral position, in case of error or for other reasons, the pawls 81 may be individually released by individual buttons 101, having shanks 102 extending through suitable openings 103 in the top 41 of the cover 40, the said shanks 102 having lateral extensions 104 which provide shoulders on the said shanks 102 to limit the movement of the buttons 101 outwardly with respect to the cover 40. Depending from the shank 102 or from the lateral extension 104 thereof is a pin 105, which lies over the pawl 81 with which it is adapted to co-operate, so that when the button 101 is pressed the corresponding pawl 81 is released from the type bar with which it co-operates and the spring 87 of the particular type bar returns the same to its neutral position. The pins 105 of the buttons 101 extend through openings formed in the transversely extending supporting bar 106, which is rigidly secured at its opposite ends to the under side of the top 41 of the cover 40, and between the lower end of the shank 102 of each of the buttons 101 and the top surface of the bar 106 is provided a spring 107 by which the said button 101 and the pawl releasing pin 105 controlled thereby is returned to an upper inoperative position.

In order to effect the printing and scarifying of the check, I provide a printing and scarifying platen 110, the upper surface 111 of which is provided with alternating grooves and ridges extending longitudinally of the machine and adapted to co-operate with the ridges and grooves of the printing characters on the under side of the type bars 50 regardless of which of the characters may be brought to the printing position on the printing line x of the machine.

A scarifying platen 115 is provided adjacent the platen 110 and this platen 115 is provided with a serrated scarifying surface provided with ridges and grooves similar to the printing and scarifying platen 110. The serrated face 116 of the scarifying platen 115 is adapted to co-operate with a correspondingly formed serrated surface 117 formed on the under side of the plate 30, so that when the platen 110 is brought into printing and scarifying contact with the printing characters of the type bars positioned at the printing line x, (see Fig. 4) to print and scarify the check on the amount line of the check, the surface 116 of the scarifying platen 115 will co-operate with the serrated surface 117 of the plate 30 to scarify the portion of the check on which is written or otherwise provided the payee's name. During this operation the guard plate 30 bears against and is supported by the face of the type characters carried by the type bars 50, the character-engaging face of the guard plate 30 being serrated as shown at 119, the serrations 119 fitting the serrations 66 of the type characters 65, so as not to destroy the serrations 66 of the type characters 65.

In order to facilitate the scarifying operations so as to require a minimum amount of power I have so arranged the platens 115 and 110 so that the corner 118 of the scarifying platen 115 will first be brought into co-operative engagement with the serrated surface 117 of the plate 30, it being understood that the check has been previously inserted in the check-receiving slot of the machine and is deposited on the upper surface of the check-supporting plate 25.

After the lead edge 118 of the platen 115 contacts with the serrated surface 117 of the plate 30 the other portions of the platens 115 and 110 are brought into contact with the serrated surface 117 of the plate 30 and the serrated surface of the type located on the printing line x in a progressive order using the lead edge 118 of the platen 115 as a pivot around which the said platens substantially turn before they are eventually brought into full flat contact with the said serrated surface 117 and the serrated surface of the type located on the printing line x. I thus provide a scissors' action which requires less pressure than a direct flat thrust wherein the entire face of the two platens would contact simultaneously with the serrated surfaces with which they cooperate to scarify the check.

In order to provide this rocking or scissors' action of the platens 110 and 115, the said platens are carried on a floating support 120 which is pivotally mounted along one of its edges on a rod 121 carried by and extending between a pair of levers or crank arms 122, which are secured to a shaft 123 extending transversely of the machine. The shaft 123 is journalled in bearings 127 secured to the side members 2 and 3. The platen carrier 120 is pivotally attached at its opposite edge, as illustrated at 124, to one end of a guide link 125, the opposite end of which is adjustably mounted in a remotely situated stud 126, which is rotatably mounted in the base portion 2b of the side frame member 2.

Extending substantially parallel to the shaft 123 and journalled in the side frame members 2 and 3 is the main operating shaft 130 of the machine. This main operating shaft extends beyond the side frame member 2, and is provided with an operating arm 131 on which is a handle 132 by which the said operating lever is actuated, the side frame member 2 being provided with stops 133 suitably padded at 134, which limit the movement of the operating arm 131 in both directions.

On the operating shaft 130 is secured a crank arm 135, in the outer end of which is a crank pin 136. Pivotally mounted at its opposite ends on the crank pin 136 and on the rod 121, which supports one edge of the floating platen-supporting member 120, is a connecting link 137.

Figure 2:
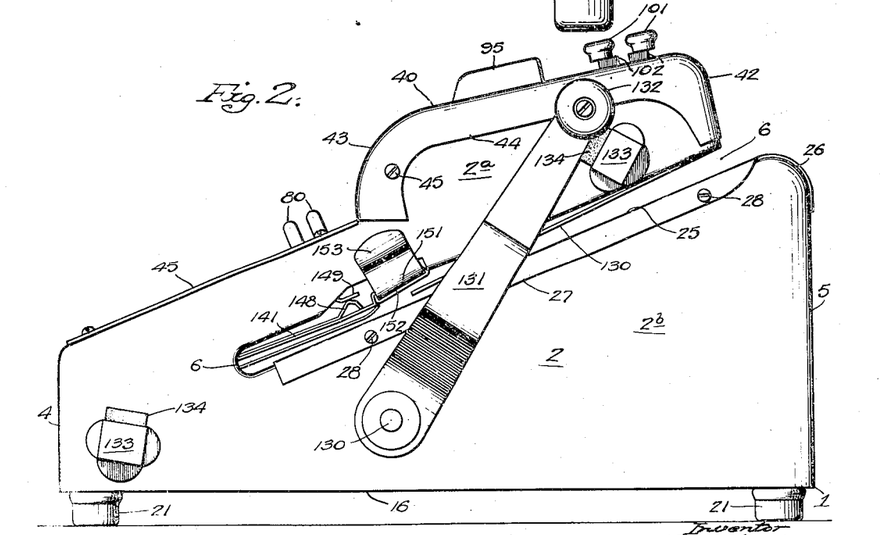
Fig. 2 is a right side elevation.

When the operating handle 131 is moved from the position shown in Fig. 2, toward a position wherein the said arm would engage the stop 133 at the forward end of the machine, the main operating shaft 130 is correspondingly rocked, which, through the link 137, rocks the printing shaft 123, which in turn raises the platen support 120 and the platens 110 and 115 carried thereby from the positions shown in Figs. 4 and 5 toward the check which is located on the top surface of the check-supporting plate 25. As the platen support 120 and the platens 110—115 carried thereby are raised in the manner noted the guide link 125 functions to guide the lead edge 118 of the platen 115 into the correct operation position with respect to the serrated surface 117 of the plate 30, it being noted that the check-supporting plate 25 is provided with a suitable opening 138 at the printing line x to permit the passage of the platens 110 and 115 therethrough. The relation of the remotely situated pivot 126 of the guide link 125 with respect to the center of rotation of the shaft 123 is such that the first turning movement of the shaft 123 raises the lead edge 118 of the platen 115 in a line substantially perpendicular to the plane occupied by the check, and continued rotation of the shaft 123 causes a rocking of the platens substantially about the point of the lead edge 118, for the reason that the said platens are held against lateral movement by the said guide link 125. Thus, the progressive scissors' action is effected between the platens and their co-operating scarifying surfaces.

During such movement of the platens the plate 30, being of a flexible nature swings on the point at which it engages the lower edge of the frame member 8 and eventually comes to rest against the lower face of the type characters disposed immediately adjacent at one side, that is to the rear, of the printing line x, the plate 30 thus acting as a guard to prevent the check from coming into contact with any of the type characters except those which are disposed at the printing line $x$ of the machine.

In the same manner the plate 35 functions to guard against the check coming in contact with the printing characters disposed in front of those which are positioned on the printing line $x$ of the machine.

In order to ink the type characters prior to the printing operation, I provide a suitable inking pad or brush 140 which normally lies at the printing line of the machine in contact with the printing surface of the characters on the under side of the type bars, and as the type bars are moved longitudinally of the machine they rub over the inking element 140 and in this manner the said characters are primarily inked.

As shown in Figs. 4 and 5, the inking element 140 is disposed between the under side of the type bars and the plates 30 and 35, and in order to remove the inking element from the printing line of the machine the said inking element is so mounted that when the operating handle is actuated to effect the printing and scarifying operation the inking element is withdrawn from the printing line in a direction longitudinally of the machine. For this purpose the inking element is carried by a supporting plate 141 having ears 142 in which are located pivot pins 143 by which the plate 141 is pivotally attached to the outer ends of levers 144. The opposite ends of the levers 144 are secured to a transversely extending rod 145 pivotally mounted in the side frame members 2 and 3 of the machine. One of the levers 144 is pivotally connected intermediate its ends at 146 to one end of a longitudinally adjustable link 147, the opposite end of which is pivotally mounted on the crank pin 136 of the main operating crank 135 and as the main operating shaft 130 is rocked in the manner above noted the inking element 140 through the link 147, levers 144 and the plate 141 is withdrawn to a position lying to the front of the printing line $x$ of the machine and overlying the guard plate 35. The guard plate 35 being of spring steel, or mounted in a manner to provide for equivalent resilient action tends to force the inking element 140 into firm wiping contact with the serrated face of the type, but is restrained by a projection 148 carried by and on each side of the plate 141, the projections 148 engaging guides 149 secured to the side members 2 and 3 of the machine respectively. The guide elements 149 are provided with depressions 150 into which the projections 148 are permitted to ride as the plate 141 is moved forwardly, which permits the inking element 140 to be momentarily pressed firmly against the type characters disposed on the printing line $x$, thus insuring that these characters are fully inked, down into the depths of the grooves, to insure that the ink will be thoroughly distributed when the scarifying and printing operation takes place. A continued rocking of the shaft 130 causes the projections 148 to ride out of the depressions 150 in the guide members 149, thus relieving the inking element 140 from the printing characters.

In order that the inking element may be readily removed for replenishing the ink supply thereon, the said inking element is secured to a bar 151 which is adapted to slide transversely of the machine and to be entirely removed therefrom, and for this purpose the supporting plate 141 is provided with a dovetail groove 152, in which the bar 151 is located, the said bar 151 being provided at one end with a finger grip 153 by which the said bar and its inking element 140 may be readily removed from the machine.

Disposed along the printing line $x$ and rigidly supported on the under side of and by the thrust bar 12 is a fixed block 160, which is located at the extreme right side of the machine and to the right of the group B of the relatively movable type bars 50 which are adapted to print the number of cents on the check, and this block 160, as shown in Fig. 16, is provided with the letters CTS., which are serrated in the same general manner as the printing characters on the type bars 50, the relatively fixed characters CTS being adapted to cooperate with the platen 110, in the same manner as the printing characters of the type bars 50.

Between the group B and the group A of type bars 50 is a second fixed printing block 165 which, as shown in Fig. 15, is provided with printing and scarifying characters DOL'S., denoting the number of dollars printed on the check.

At the extreme left side of the group A of type bars 50 is a relatively fixed type-supporting block 170, which, in the present instance, and as shown in Fig. 14, is provided with a dovetail groove 171 which extends transversely of the machine. In the said dovetail groove 171 is located a symbol block 175 on which may be formed any desired protective symbol, such as the monogram or initials of the parties entitled to write checks on the machine. The symbol block in the present instance merely bears the wording "The amount of", for the purpose of illustration.

If desired the protective symbol 175 may be of a scarifying nature co-operating with the serrated surface 111 of the platen 110, but in the present instance I have shown the symbol block 175 as having plain flat faced type thereon which co-operate with a correspondingly smooth faced portion formed on the platen 110, or a separate platen block 174 having a plain surface 173 (see Fig. 6), which may be of a resilient material which will firmly but yieldably press the check against the printing surface of the characters on the protective symbol block 175.

During the printing and scarifying operations above referred to, the guard plate 30 is supported between and at the outside edge of one of the groups A and B of type bars 50, by lips 165a and 170a formed on the blocks 165 and 170 respectively, the lip 165a being serrated in a manner to cooperate with the upper serrations 119 on the guard plate 30.

In order to properly position the check to be written on the check-supporting plate 25 so that the amount line on the check will be in the proper relation to the printing line $x$ of the machine, and the line on which the payee's name is written will be in correct position with respect to the serrated surface 117 of the guard plate 130, I provide a guide for the check which is movable longitudinally of the machine. This guide comprising a bar 180 which extends transversely of the machine and has lugs 181, 182 and 183 which are adapted to pass through slots 184, 185 and 186 formed in the front end 29 of the check-supporting plate 25, the said lugs 181, 182 and 183 passing through the said check-supporting plate 25 and engaging the under side of the flexible guard plate 35. In order that contact may be at all times maintained between the guide lugs and the guard plate 35, the bar 180, on which the said lugs are formed, is yieldably supported by flat springs 187 and 188 which are secured to the forward end 29 of the plate 25 by the screws 38 which maintain the guard plate 35 in position on the said check-supporting plate 25.

In order to move the guide lugs longitudinally of the machine the bar 180 is provided with the forwardly extending arm 189 in which is formed teeth 190 which are adapted to intermesh with teeth 191 formed on a wheel which is secured to a shaft 192 journalled in the side frame members 2 and 3 and extending transversely of the machine, the forward end of the arm 189 passing through a guide opening 193 formed in a retaining bar 194, which is secured to the check-supporting plate 25 by the said screws 38 by which the other above mentioned elements are secured to the plate 25. On the outside of the machine, adjacent the side frame member 3, the shaft 192 is provided with an operating knob 195 and inside the side frame member 3 the said shaft is provided with a collar 196 which prevents axial movement of the shaft with respect to the frame of the machine.

For determining the position of the check with respect to the printing line of the machine, the said machine is provided with an indicating element 200 which is pivotally but firmly attached to the side member 3 of the machine by a screw 199, the said indicating element 200 having a straight edge 198 with which the amount line of the check is adapted to be aligned by manipulation of the guide lugs 181, 182 and 183 through the operating knob 195. The indicating element 200 also serves as a means for maintaining the symbol block 175 in position within the machine.

Figure 3:
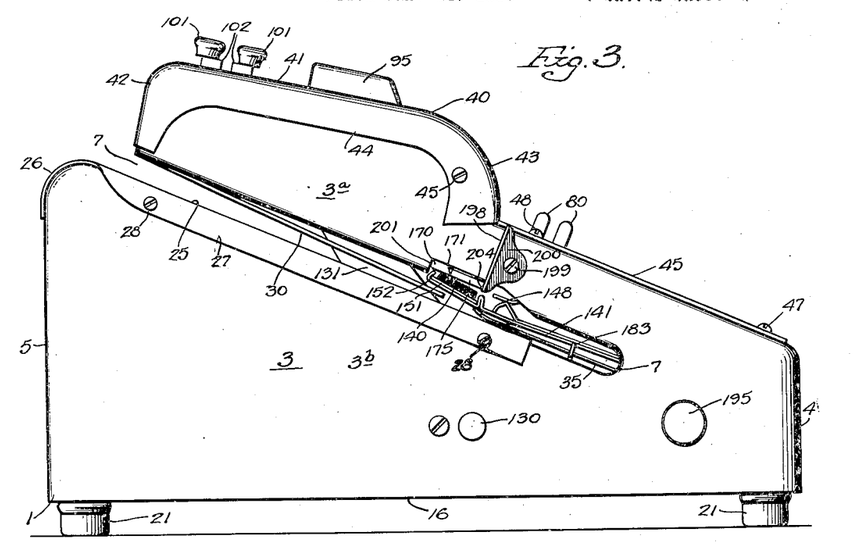
Fig. 3 is a left side elevation.

Upon referring to Fig. 3, it will be noted that the side frame member 3a is apertured at 201 for the purpose of permitting the symbol block 175 to be removed, so that symbol blocks bearing different protective characters, individual to the parties using the machine, may be inserted.

As shown in Fig. 14, the symbol block 175 is shouldered as indicated at 202 and this shoulder is adapted to engage the outer end 201 of the symbol-supporting block 170 to prevent movement of the symbol block 175 inwardly with respect to the fixed supporting block 170, and the said symbol block 175 is notched, as indicated at 204, for the reception of the indicator 200 which, when turned about its pivot to the position shown in Fig. 3, prevents outward movement of the symbol block 175 with respect to the machine. Obviously, when the indicating element 200 is turned about the screw 199 from a position wherein the edge 198 of the said indicating element is substantially perpendicular to the check-supporting plate 25 to a position wherein said edge is disposed at an angle with respect to the said check-supporting plate 25, the symbol block 175 is free to be removed from the machine by a lateral movement with respect to the machine. It will also be noted that while the indicating element 200 forms a means for maintaining the symbol block 175 within the machine the notch portion 204 of the said symbol block 175 functions as a stop for the indicating element 200 so that the edge 198 thereof will be disposed substantially perpendicular to the check-supporting plate 25 and in correct relation to the printing line $x$ of the machine.

From the above description taken in consideration with the drawings, it will be obvious that I have provided a comparatively simple and efficient machine by which checks may be readily written in any desired amount, in the present case up to $999,999.99, or more or less than this amount, depending upon the number of type bars placed in the machine, and that in a single operation the entire machine may be cleared, all type bars assuming their neutral positions; and that the type bar of any individual column may be quickly returned to its neutral position without interfering with any of the other type bars, in the event of an error having been made in the selection; and that the amount of the check is printed and scarified, and the payee's name space simultaneously scarified during the printing of the amount of the check; and that the machine contains a minimum number of parts, which may be produced with a minimum amount of labor, thus enabling the machine to be assembled at a minimum cost, requiring little or no attention to keep the machine in a workable condition.

I claim:

1. In a check writer, the combination of a type bar having printing characters on one side and identifying characters on the opposite side thereof, a platen adapted to press the check into printing contact with one of the printing characters, an abutment adjacent the last said side of the type bar and adapted to engage the same during the printing of the check, the abutment-engaging side of the type bar having a groove formed therein, and the said identifying characters being depicted on a strip adapted to lie in said groove with the character-bearing surface of the strip disposed in a plane below the plane of the abutment-engaging surface of the type bar.

2. In a check writer, the combination of a type bar having printing characters on one side and identifying characters on the opposite side thereof, a platen adapted to press the check into printing contact with one of the printing characters, an abutment adjacent the last said side of the type bar and adapted to engage the same during the printing of the check, the abutment-engaging side of the type bar having a groove formed therein, and the said identifying characters being depicted on a strip adapted to lie in said groove with the character-bearing surface of the strip disposed in a plane below the plane of the abutment-engaging surface of the type bar, and means for maintaining the character strip in said groove.

3. In a check writer, the combination of a type bar having printing characters on one side and identifying characters on the opposite side thereof, a platen adapted to press the check into printing contact with one of the printing characters, an abutment adjacent the last said side of the type bar and adapted to engage the same during the printing of the check, vertically extending walls on the longitudinal edges of the type bar, a strip bearing said identifying characters located between said walls, and lateral projections on said walls extending inwardly over said strip and providing abutment-engaging surfaces on the type bar.

4. In a check writer, the combination of a plurality of substantially parallel type carrying elements, a series of printing characters on each of said elements, a movable platen extending transversely of said elements and adapted to press a check into printing contact with a series of said printing characters disposed on a line extending transversely of the series of type carrying elements, a guard plate overlying the printing characters disposed adjacent and at one side of said printing line, said guard plate having a serrated surface adjacent said printing line, and a scarifying platen movable with the said printing platen and adapted to co-operate with the serrated surface of the guard plate to scarify a portion of the check adjacent the portion engaged by the printing characters, said scarifying being affected substantially simultaneously with the printing operation.

5. In a check writer, the combination of a plurality of substantially parallel type carrying elements, a series of printing characters on each of said elements, a movable platen extending transversely of said elements and adapted to press a check into printing contact with a series of said printing characters disposed on a line extending transversely of the series of type carrying elements, a guard plate overlying the printing characters disposed adjacent and at one side of said printing line, said guard plate having a serrated surface adjacent said printing line, and a scarifying platen movable with the said printing platen and adapted to co-operate with the serrated surface of the guard plate to scarify a portion of the check adjacent the portion engaged by the printing characters, said scarifying being affected substantially simultaneously with the printing operation, said guard plate bearing on the printing surface of the printing characters underlying the same during the printing and scarifying operation.

6. In a check writer, the combination of a plurality of substantially parallel type bars, a plurality of printing characters on one side of each of said type bars, a movable platen extending transversely of said type bars and adapted to press a check into printing contact with a row of the printing characters disposed on a line extending transversely of the series of the type bars, a guard plate overlying the printing characters disposed at one side of said line, said guard plate having a serrated surface extending transversely of the series of type bars and substantially parallel to said line, and a scarifying platen substantially parallel to and movable with the said printing platen and adapted to co-operate with the serrated surface of the guard plate to scarifying a portion of the check adjacent and substantially parallel to the portion engaged by the printing characters, said scarifying being affected substantially simultaneously with the printing operation.

7. In a check writer, the combination of a frame, a plurality of substantially parallel supporting rods secured at their opposite ends in said frame, a plurality of type bars respectively mounted for longitudinal movement on said supporting rods, a plurality of printing characters on one side of each of said type bars, a movable platen extending transversely of said type bars and adapted to press a check into printing contact with the printing characters of said type bars disposed on a line extending transversely of the series of type bars, a guard plate overlying the printing characters disposed at one side of said printing line, said guard plate having a serrated surface extending transversely of the series of type bars and substantially parallel to said printing line, a scarifying platen substantially parallel to and movable with the said printing platen and adapted to co-operate with the serrated surface of the guard plate to scarify a portion of the check adjacent and substantially parallel to the portion engaged by the printing characters, said scarifying being affected substantially simultaneously with the printing operation, and a thrust bar disposed adjacent the opposite side of said series of type bars and extending transversely of said series of type bars and adapted to take the thrust attending the said printing and scarifying of the check.

8. In a check writer, the combination of a series of type characters having serrated type faces and arranged in alignment one with the other, a scarifying element disposed substantially parallel to and at one side of said row of type characters, a platen having a serrated face adapted to cooperate with the serrated face of said type characters, a second platen having a serrated face adapted to cooperate with a correspondingly serrated face on the scarifying element, and a single carrier on which both of said platens are mounted for simultaneous cooperation with the said serrated faces of the type characters and the scarifying element adjacent thereto.

9. In a check writer, the combination of a plurality of substantially parallel type bars respectively provided with series of printing characters having serrated type faces and disposed in substantially parallel rows extending transversely of the series of type bars, a printing platen common to all of said type bars and having a serrated face adapted to press a check into printing and scarifying contact with the serrated type faces of one of the transversely extending rows of type characters, means for moving the said platen toward said bars, and means for guiding said platen in its said movement, to cause a progressive engagement of the platen with the type characters starting at one transversely extending edge thereof and progressing to the opposite transversely extending edge thereof.

10. In a check writer, the combination of a plurality of substantially parallel type bars respectively provided with series of printing characters having serrated type faces and disposed in substantially parallel rows extending transversely of the series of type bars, a printing platen common to all of said type bars and having a serrated face adapted to press a check into printing and scarifying contact with the serrated type face of one of the transversely extending rows of type characters, means for moving the said platen toward said bars, a floating carrier for supporting said platen, a crank arm having one end pivotally connected to one edge of the carrier, for moving said carrier toward said type bars, and a link pivotally connected at one of its ends to the opposite edge of the carrier, the opposite end of said link having a relatively fixed pivot remotely situated with respect to said carrier and said crank, for guiding the carrier in a manner whereby the platen will have progressive rocking engagement with the type characters on the said bars.

11. In a check writer, the combination of a plurality of substantially parallel type bars respectively provided with series of printing characters having serrated type faces disposed in substantially parallel rows extending transversely of the series of type bars, one of said rows constituting a printing line, a guard extending over the row of type characters adjacent the said printing line and having a serrated surface adjacent and substantially parallel to the said printing line, a printing platen having a serrated face adapted to press a check into printing and scarifying contact with the serrated type faces disposed on said printing line, a scarifying platen extending substantially parallel to the said printing platen, and movable therewith into scarifying contact with the said serrated surface of the guard, and operating means for effecting a simultaneous rocking movement of said platens to produce a scarifying action starting at one edge of one of the platens and progressing to the opposite edge of the other of said platens as they are progressively rocked into scarifying contact with the serrated portion of the guard plate and serrated type faces adjacent thereto and located on the said printing line.

12. In a check writer, the combination of a plurality of substantially parallel type bars respectively provided with series of printing characters having serrated type faces disposed in substantially parallel rows extending transversely of the series of type bars, one of said rows constituting a printing line, a guard extending over the row of type characters adjacent the said printing line and having a serrated surface adjacent and substantially parallel to the said printing line, a printing platen having a serrated face adapted to press a check into printing and scarifying contact with the serrated type faces disposed on said printing line, a scarifying platen extending substantially parallel to the said printing platen, and movable therewith into scarifying contact with the said serrated surface of the guard, and operating means for effecting a simultaneous rocking movement of said platens to produce a scarifying action starting at one edge of one of the platens and progressing to the opposite edge of the other of said platens as they are progressively rocked into scarifying contact with the serrated portion of the guard plate and serrated type faces adjacent thereto and located on the said printing line, said guard resting on the row of type adjacent the printing line and having serrations fitting the serrations of the type faces on which the guard rests.

13. In a check writer, the combination of a plurality of substantially parallel type bars respectively provided with series of printing characters having serrated type faces and disposed in substantially parallel rows extending transversely of the series of type bars, one of said rows constituting a printing line, a guard extending over the row of type characters adjacent the said printing line and having a serrated surface adjacent and substantially parallel to the said printing line, a printing platen common to all the said bars, said printing platen having a serrated face adapted to press a check into printing and scarifying contact with the serrated type faces disposed on said printing line, a scarifying platen extending substantially parallel to the said printing platen, and movable therewith into scarifying contact with the said serrated surface of the guard, operating means for effecting a rocking movement of said platens to produce a scarifying action starting at one edge of one of the platens and progressing to the opposite edge of the other of said platens as they are progressivley rocked into scarifying contact with the serrated portion of the guard plate and the adjacently disposed serrated type faces located on the said printing line, said operating means comprising a floating carrier common to both of said platens, a crank arm having one end pivotally connected to one edge of said floating carrier, an operating shaft on which the opposite end of said crank is secured, and a link having one of its ends pivotally connected to the opposite edge of said floating carrier and its opposite end pivotally mounted at a point remotely situated with respect to the carrier and the said operating shaft.

14. In a check writer, the combination of a plurality of type bars, a platen cooperating with said type bars, a flexible guard plate below said type bars, a check supporting plate below said flexible guard plate and cooperating therewith to form a check receiving slot therebetween, a guide for a check disposed in said check slot, said guide comprising lugs extending through slots formed in said check supporting plate and across the said check slot into contact with the said flexible guard plate, and resilient means for maintaining said lugs in contact with the flexible guard plate at all times.

15. In a check writer, the combination of a plurality of type bars, a platen cooperating with said type bars, a flexible guard plate below said type bars, an inking element movable between said type bars and the said flexible guard plate, said flexible guard plate functioning to move the inking element into contact with the type bars at all times, means normally restraining the inking element from said movement and permitting said movement momentarily when the inking element is moved longitudinally of the type bars.

16. In a check writer, the combination of a frame constituting a main support and a casing and having a check receiving slot extending inwardly from one end of the casing and at an angle to the base thereof, a plurality of longitudinally slidable type bars located in the overhanging portion of the casing above the check slot, printing characters on the lower sides of said type bars and adapted to be brought selectively into printing position on a line extending transversely of the casing, a resilient guard plate forming in part the upper wall of the check slot and covering the type characters disposed at one side of the printing line, a second resilient guard plate forming another part of the upper wall of the check slot and covering the type characters disposed at the opposite side of said printing line, a pair of movable platens normally lying below said check slot, a check supporting plate forming the bottom of the check slot and having one opening through which said platens are adapted to be moved on into printing contact with the type characters located on the said printing line, and the other into contact with one of the said guard plates adjacent the printing line, the said engaged portion of the said guard plate and the engaging portion of the platen cooperating therewith, each having serrated surfaces for scarifying a portion of the check adjacent the line of printing placed thereon by the said printing characters disposed on the printing line of the machine.

17. In a check writer the combination of a frame constituting a main support and a casing and having a check slot extending inwardly from one end of the casing and at an angle with respect to the base thereof, a plurality of circular rods located in the overhanging portion of the casing above the check slot, a plurality of type bars respectively mounted on and supported solely by said circular rods, lugs on said type bars, and a cover plate for said casing having guide slots through which said lugs extend to prevent excessive lateral rocking of the type bars on the said circular supporting rods.

18. In a check writer the combination of a frame constituting a main support and a casing and having a check slot extending inwardly from one end of the casing and at an angle with respect to the base thereof, a plurality of circular rods located in the overhanging portion of the casing above the check slot, a plurality of type bars respectively mounted on and supported solely by said circular rods, lugs on said type bars and a cover plate for said casing having guide slots through which said lugs extend to prevent excessive lateral rocking of the type bars on the said circular supporting rods, a platen disposed below the check slot and adapted to be moved into printing contact with the type bars, and a thrust bar located in the overhanging portion of the casing and adapted to take the thrust of said platen, thereby relieving the said circular supporting rods of said thrust.

19. In a check writer, the combination of a plurality of longitudinally movable and substantially parallel type bars respectively provided with series of printing characters having serrated type faces and disposed in substantially parallel rows extending transversely of the series of type bars, one of said rows constituting a printing line, said type bars being divided into two groups, a relatively fixed element disposed between said groups and having type characters with serrated type faces disposed on said printing line, a relatively fixed element disposed at the outside of one of said groups and having type characters with serrated type faces disposed on the said printing line, a guard extending over the row of type characters adjacent the said printing line and having a serrated surface adjacent and substantially parallel to the said printing line, a printing platen common to all the said bars and the other said elements having type characters disposed on the printing line, said printing platen having a serrated face adapted to press a check into printing and scarifying contact with the serrated type faces disposed on said printing line, a scarifying platen extending substantially parallel to the said printing platen and movable therewith into scarifying contact with the said serrated surface of the guard, and operating means for effecting a rocking movement of said platens to produce a scarifying action starting at one edge of one of the platens and progressing to the opposite edge of the other of said platens as they are progressively rocked into scarifying contact with the serrated portion of the guard plate and the serrated type faces adjacent thereto and located on the said printing line.

20. In a check writer, the combination of a plurality of longitudinally movable and substantially parallel type bars respectively provided with series of printing characters having serrated type faces and disposed in substantially parallel rows extending transversely of the series of type bars, one of said rows constituting a printing line, said type bars being divided into two groups, a relatively fixed element disposed between said groups and having type characters with serrated type faces disposed on said printing line, a relatively fixed element disposed at the outside of one of said groups and having type characters with serrated type faces disposed on the said printing line, a guard extending over the row of type characters adjacent the said printing line and having a serrated surface adjacent and substantially parallel to the said printing line, a printing platen common to all the said bars and the other said elements having type characters disposed on the printing line, said printing platen having a serrated face adapted to press a check into, printing and scarifying contact with the serrated type faces disposed on said printing line, a scarifying platen extending substantially parallel to the said printing platen and movable therewith into scarifying contact with the said serrated surface of the guard, and operating means for effecting a rocking movement of said platens to produce a scarifying action starting at one edge of one of the platens and progressing to the opposite edge of the other of said platens as they are progressively rocked into scarifying contact with the serrated portion of the guard plate and the serrated type faces adjacent thereto and located on the said printing line, the opposite face of said guard plate resting on the row of type faces disposed adjacent the printing line and on the said rigid members associated with said type bars during the printing and scarifying operation, and having serrations on the said opposite face fitting the corresponding serrations of the type characters on which the guard plate rests.

JOHN WHITAKER.